R. M. JONES.
DIFFERENTIAL AXLE DEVICE.
APPLICATION FILED AUG. 17, 1911.

1,015,737.

Patented Jan. 23, 1912.

Witnesses
C. Heymann
E. Garber

Inventor:
Richard M. Jones
by P.J. Singer
atty

UNITED STATES PATENT OFFICE.

RICHARD M. JONES, OF LONDON, ENGLAND.

DIFFERENTIAL-AXLE DEVICE.

1,015,737. Specification of Letters Patent. Patented Jan. 23, 1912.

Application filed August 17, 1911. Serial No. 644,657.

*To all whom it may concern:*

Be it known that I, RICHARD MORRIS JONES, a subject of the King of Great Britain and Ireland, residing at 11 Parsons Green Lane, Fulham, London, England, have invented certain new and useful Improvements in Differential-Axle Devices, of which the following is a specification.

This invention relates to a differential axle of that kind in which the axle is in two pieces, held in alinement by a central pin, coupled together, and adapted to revolve, either together or irrespectively of each other. And has for its object to provide an improved construction of axle which shall be capable of effectively withstanding a high tensile strain, end thrust, and heavy radial pressure.

Now according to this invention, each adjacent end of the axle to be joined is turned down to form a groove and a collar, the collar being of less diameter than the axle and the two parts of the axle are held together by a longitudinally divided coupling ring of the diameter of the axle and having internal flanges fitting into the grooves and held together by an external sleeve.

In order that my invention may be readily understood and carried into practice, reference is hereby made to the accompanying sheet of illustrative drawings, wherein—

Figure 1:
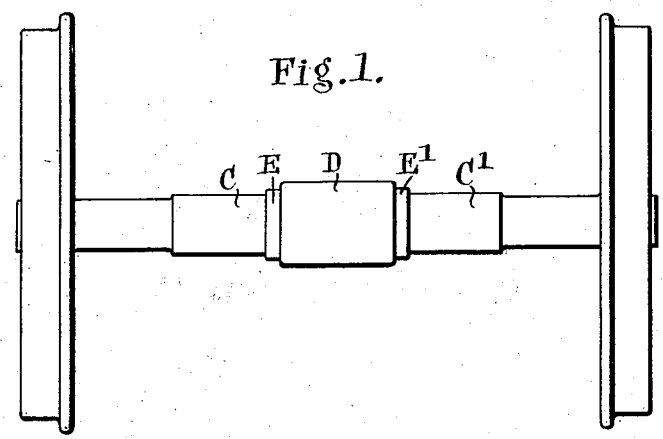
Figure 2:
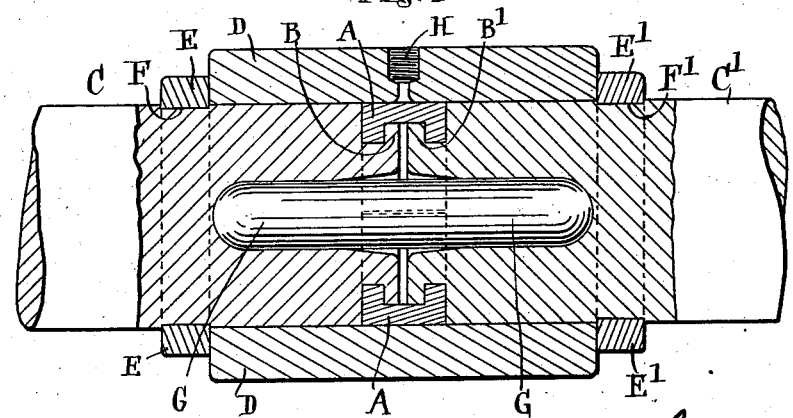

Figure 1 is an elevational view of an example of my invention, applied to the bogie axle of a locomotive. Fig. 2 is a sectional view to an enlarged scale of the coupling device and bearing.

The coupling ring A of the external diameter of the axle and divided longitudinally of the axle to form two symmetrical halves is formed with internal flanges at its ends.

The axle c c' is turned down at or near its center, to fit the coupling ring A, that is to say, with two grooves and a central collar B B' between the grooves and of less diameter than the axle. The two parts of the coupling ring are held together by the retaining sleeve D that is retained in place longitudinally by two rings E E' that are shrunk into slight grooves or recesses F F' in the axle. Preferably each inner end of the axle is bored out centrally, the holes tapering slightly inward for a third of the depth and being rounded at the bottom. A parallel pin G with rounded ends fits in the holes.

To assemble the axle, the annular securing ring E is expanded by heating, to allow it to pass over the part F of the axle, where on cooling it is rigidly shrunken thereon. The pin G is then inserted in the end of the axle C'. The annular securing ring E' is expanded by heating and passed along the axle C' toward the wheel and is followed by the outer sleeve or bearing D. Both parts of the axle are then brought nearly together, and the two halves of the annular coupling ring A are placed in position and the sleeve D is passed over the same, and along the axle to butt against the annular securing ring E. The annular securing ring E' is passed back along the axle to F' where on cooling it is rigidly shrunken thereon. The sleeve bearing D is provided with lubricant port H which is partly threaded to receive a small lubricator, and has internal lubricating grooves. The pin G has longitudinal lubricating channels, but these are not in line throughout the whole length of pin, being cut from center and deepening somewhat toward the ends to allow of a free flow of lubricant to those parts.

Referring to the sleeve bearing D if desired the same could be lined with an anti-friction metal, or partly lined with same, allowing the radial pressure to be taken by both metals, of course in either case, it will be necessary to proportionately increase the diameter of the sleeve D.

What I claim and desire to secure by Letters Patent is:—

1. A differential axle consisting of collars on the ends of the axle, of less diameter than the axle, a divided coupling ring having internal flanges fitting in the grooves behind the collars and a sleeve fitting over the divided coupling ring and the means for holding the retaining sleeve in position longitudinally, consisting of the securing rings shrunk into recesses in the axle.

2. In a differential axle, the combination with divided ends of the axle arranged in end to end relation, means revolubly connecting said ends, each end having a normal and uniform diameter extending inwardly from the meeting end portions, a sleeve surrounding the normal diametrical portion of said ends, said end portions having annular recesses adjacent the end of said sleeve, and collars shrunk into said annular recesses to lock the sleeve against endwise movement, substantially as described.

3. In a differential axle, the combination with the divided ends of the axle arranged in end to end relation, each end having a normal and uniform diameter extending inwardly from the end portion, a sleeve surrounding the normal diametrical portions of said ends, said end portions having annular recesses adjacent the end of said sleeve, and collars shrunk into said annular recesses to lock the sleeve against endwise movement, substantially as described.

In testimony whereof I affix my signature, in presence of two witnesses.

RICHARD M. JONES.

Witnesses:
J. W. MACKENZIE,
A. JONES.

Copies of this patent may be obtained for five cents each, by addressing the "Commissioner of Patents, Washington, D. C."